United States Patent
Rosenwald et al.

(10) Patent No.: US 8,767,566 B2
(45) Date of Patent: Jul. 1, 2014

(54) METHOD AND APPARATUS FOR VERIFYING SIGNALING AND BEARER CHANNELS IN A PACKET SWITCHED NETWORK

(75) Inventors: Jeffrey A. Rosenwald, Frederick, MD (US); Joseph D. Kralowetz, Clarksville, MD (US)

(73) Assignee: Tellabs Vienna, Inc., Naperville, IL (US)

( * ) Notice: Subject to any disclaimer, the term of this patent is extended or adjusted under 35 U.S.C. 154(b) by 1876 days.

(21) Appl. No.: 11/731,018

(22) Filed: Mar. 29, 2007

(65) Prior Publication Data

US 2008/0144518 A1 Jun. 19, 2008

Related U.S. Application Data (60) Provisional application No. 60/875,143, filed on Dec. 15, 2006.

(51) Int. Cl.
*H04L 12/26* (2006.01)

(52) U.S. Cl.
USPC .......................................................... 370/252

(58) Field of Classification Search
None
See application file for complete search history.

(56) References Cited

U.S. PATENT DOCUMENTS

| | | | |
|---|---|---|---|
| 6,275,797 B1 * | 8/2001 | Randic | 704/233 |
| 6,658,097 B2 * | 12/2003 | Hofer et al. | 379/93.28 |
| 6,718,296 B1 * | 4/2004 | Reynolds et al. | 704/200.1 |
| 7,016,475 B2 | 3/2006 | Resuta | |
| 7,076,316 B2 | 7/2006 | Rabipour et al. | |
| 7,130,273 B2 * | 10/2006 | Baj | 370/242 |
| 7,173,910 B2 * | 2/2007 | Goodman | 370/252 |
| 7,197,010 B1 * | 3/2007 | Berstein et al. | 370/252 |
| 7,274,669 B2 * | 9/2007 | Czerwiec et al. | 370/241 |
| 7,315,812 B2 * | 1/2008 | Beerends | 704/200.1 |
| 7,376,132 B2 * | 5/2008 | Conway | 370/389 |
| 2003/0108032 A1 * | 6/2003 | Kato | 370/352 |
| 2003/0231741 A1 | 12/2003 | Rancu et al. | |
| 2004/0190494 A1 * | 9/2004 | Bauer | 370/352 |
| 2004/0193974 A1 * | 9/2004 | Quan et al. | 714/724 |
| 2005/0190891 A1 * | 9/2005 | Shah et al. | 379/1.03 |
| 2005/0254629 A1 * | 11/2005 | China et al. | 379/24 |
| 2006/0034185 A1 * | 2/2006 | Patzschke et al. | 370/252 |
| 2006/0187824 A1 * | 8/2006 | Huang et al. | 370/229 |
| 2006/0187848 A1 * | 8/2006 | Zaniolo et al. | 370/252 |
| 2006/0188080 A1 | 8/2006 | Terpstra et al. | |
| 2006/0203801 A1 * | 9/2006 | Li et al. | 370/352 |
| 2007/0041554 A1 | 2/2007 | Newman et al. | |
| 2007/0116184 A1 | 5/2007 | Gonsalves et al. | |
| 2007/0127389 A1 * | 6/2007 | Klotz et al. | 370/252 |
| 2007/0177514 A1 * | 8/2007 | Harrington et al. | 370/241 |
| 2007/0263598 A1 * | 11/2007 | Chen et al. | 370/352 |
| 2008/0285764 A1 * | 11/2008 | Chung et al. | 381/58 |
| 2009/0018825 A1 * | 1/2009 | Bruhn et al. | 704/222 |

* cited by examiner

*Primary Examiner* — Brian Roberts
(74) *Attorney, Agent, or Firm* — Hamilton, Brook, Smith & Reynolds, P.C.

(57) ABSTRACT

A computer-implemented method and apparatus verifies integrity of a Voice over Internet Protocol (VoIP) virtual connection at an analog terminal adapter (ATA) at an edge of an Internet Protocol (IP) network. A VoIP transaction is initiated toward a cooperating test unit across the IP network, establishing a VoIP virtual circuit. The test unit responds by transmitting a digital representation of or information representing a test tone across the IP network to the ATA. By evaluating the test tone at the ATA, integrity of a bearer channel of the virtual circuit can be verified directly, and integrity of a signaling channel of the virtual circuit can be verified indirectly.

21 Claims, 6 Drawing Sheets

METHOD AND APPARATUS FOR VERIFYING SIGNALING AND BEARER CHANNELS IN A PACKET SWITCHED NETWORK

RELATED APPLICATION

This application claims the benefit of U.S. Provisional Application No. 60/875,143, entitled "Method and apparatus for verifying of signaling and bearer channels in VoIP applications," filed on Dec. 15, 2006, the entire teachings of which are incorporated herein by reference.

BACKGROUND OF THE INVENTION

In traditional circuit-switched voice networks, a test commonly referred to as a "Draw and Break Dialtone" (DBDT) test is provided to assist a craft person (e.g., network technician) operating the network in sectionalizing "no-dialtone" customer complaints. The test includes first causing a subscriber's line to go off-hook (a loop closure), and then listening and detecting voice-frequency information from the subscriber's line. The craft person qualifies the received voice-frequency information as dial-tone and only dial-tone. The craft person then causes a dial-pulse sequence or dual-tone multi-frequency (DTMF) digit sequence to be emitted from a subscriber's line toward the circuit switch. In a functioning network, the dial-pulse sequence is expected to cause the dial tone to cease. Thus, the craft person verifies that the dial-tone was removed in response to the detection of the dial-pulse or DTMF sequence activity. Upon completion of this test, the subscriber's line is restored to its normal idle state, and the craft person records the results of the test.

In typical circuit-switched networks, a voice-frequency (VF) bearer information channel carries a plurality of discrete digital samples representing an audio signal corresponding to a call, and a signaling channel carries administrative data regarding the call. Both the bearer channel and signaling channel travel over the same logical channel, which is caused to be automatically created by the circuit-switch in response to a subscriber loop-closure event. Thus, the DBDT test, when executed successfully, is a fair and reliable test of both the signaling and VF bearer channel of the subscriber's circuit. Failure of the circuit switch to emit a dial-tone toward a subscriber line in response to a loop-closure event within a prescribed amount of time is cause for a corrective action on the part of the network operator. Likewise, failure of the circuit-switch to remove the dial-tone within a prescribed amount of time after a dial sequence is also a cause for a corrective action on the part of the network operator.

SUMMARY OF THE INVENTION

Embodiments of the present invention may include a method of verifying integrity of a logical channel traversing a VoIP network. A device across the VoIP network, such as a remote test unit, is caused to transmit bearer information via a bearer channel over the VoIP network. The bearer information may be received by a network terminal across the network. The bearer information is evaluated in order to verify integrity of the bearer channel on the VoIP network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

A Voice over Internet Protocol (VoIP) telecommunications network enables telephonic communications across an Internet Protocol (IP) network. A VoIP network architecture is distinct from traditional circuit-switched architecture in several ways. Typical circuit-switched networks include a network transmission line that carries audio signals to a circuit switch. The audio signals traverse a circuit-switched network through switches that remain in a given state throughout the call to carry the audio signals between calling parties. In contrast, in a VoIP network architecture, bearer information (representing a continuous audio signal) and signaling data are transmitted across the IP network as data packets, which may traverse the network through a number of network elements. The packets are exchanged with a network terminal operating as a "soft switch" and are transformed to corresponding bearer information and supervisory data at each endpoint of the IP network.

The conventional procedure to troubleshoot a "no dial-tone" subscriber complaint for a VoIP application is for a craft person to inspect a collection of configuration databases in order to verify that the subscriber has, for example, a valid IP address, a valid security credential, and that the subscriber's Analog Terminal Adapter (ATA) has successfully negotiated and maintains a registration with a proper registration authority. The craft person possesses equipment to monitor subscriber traffic to verify that a local subscriber may exchange signaling information with a far-end subscriber by way of a signaling channel that is designated for this purpose. The equipment must also verify that a local subscriber may exchange voice-frequency (VF) bearer information by way of a separate and disjoint bearer channel that is designated for this purpose. This troubleshooting procedure requires specialized equipment to be in the possession of the craft person and requires considerable time and skill on the part of the craft person to operate it.

Traditional circuit-switched networks may be supplanted by networks that utilize a Voice over IP (VoIP) application operating over an Internet Protocol (IP) network. Under this architecture, the conventional "Draw and Break Dial Tone" (DBDT) procedure may not be a fair test of both the signaling and VF bearer channel of the subscriber's circuit. In VoIP applications, call progress signals, including dial-tone, are emitted locally from an analog terminal adapter (ATA). No bearer channel is created until (i) a far-end subscriber is selected by way of addressing (dialing), (ii) the far-end subscriber is notified by way of alerting, and (iii) the far-end subscriber has agreed to the invitation by answering. Once these conditions are established, the local ATA and the far-end subscriber ATA establish a two-way exchange of VF bearer information. Exchanging signaling information and exchanging bearer information are coordinated with each other but disjointed from each other. That is to say that the signaling information and VF bearer information are free to traverse the network independently and may indeed travel through separate packet switching subsystems and physical networks entirely. Any test that is intent on verifying the VoIP application must be capable of verifying integrity of both the signaling and the bearer channels, regardless of how they are managed within a network, even if only implicitly verifying the integrity of the signaling channel.

Embodiments of the present invention provide a method by which a craft person may verify integrity of a subscriber line in a VoIP telecommunications network. An example test initiates and monitors a call on the subscriber line. The test verifies whether a call is successfully completed and that the bearer information is present and valid across the network. Through this verification, the underlying configuration of the various subsystems that support the subscriber call may also be verified, by which they are in harmony with the intended switched voice services. Such testing and verification may optionally be conducted periodically or on aperiodic, on-demand, or event-driven bases as a component of surveillance tests. Trouble may be systematically and proactively identified and forwarded for corrective action.

Further embodiments of the invention enable an operator to verify the integrity of a VoIP virtual connection from a remote Analog Terminal Adapter (ATA) to a soft-switch in a VoIP application operating in an Internet Protocol (IP) network environment. Indirect verification of the continuity of the signaling channel may be enabled by direct verification of the integrity voice-frequency (VF) bearer channel. Internal signaling activity stimulates a VoIP transaction toward a cooperating test unit peer, where the cooperating peer resides in an advantageous location in a network that supports a VoIP application. In response, the test unit peer may emit a standardized payload toward the ATA via a customary transmission between the VoIP applications. The evaluation of the quality of the standardized payload is the responsibility of the ATA.

Embodiments of the present invention may further verify integrity of a logical channel traversing a VoIP network. A device across the VoIP network, such as a remote test unit, is caused to transmit bearer information via a bearer channel over the VoIP network. The bearer information may be received by a network terminal across the network. The bearer information is evaluated in order to verify integrity of the bearer channel on the VoIP network. Such evaluation may include (i) filtering the bearer information to produce filtered bearer signals; (ii) from the filtered bearer signals, determining amplitude and noise of the bearer information; and (iii) verifying whether the determined amplitude and noise comply with respective amplitude and noise thresholds. By way of this evaluation, the integrity of a corresponding signaling channel may also be verified. The evaluation may also be performed independent of a hook state of customer-provided equipment.

Further embodiments may operate through a VoIP application at an Optical Network Terminal (ONT) including an ATA. A test apparatus within the ATA may be configured to expect and detect the payload transmitted by the test unit, to detect impairments in the payload, and to verify the integrity of the payload via signal processing, such as Digital Signal Processing (DSP) or other form of audio processing. Through an interface in communication with the ONT, an operator may remotely cause the test, as well as receive and present the results of the test.

Figure 1:
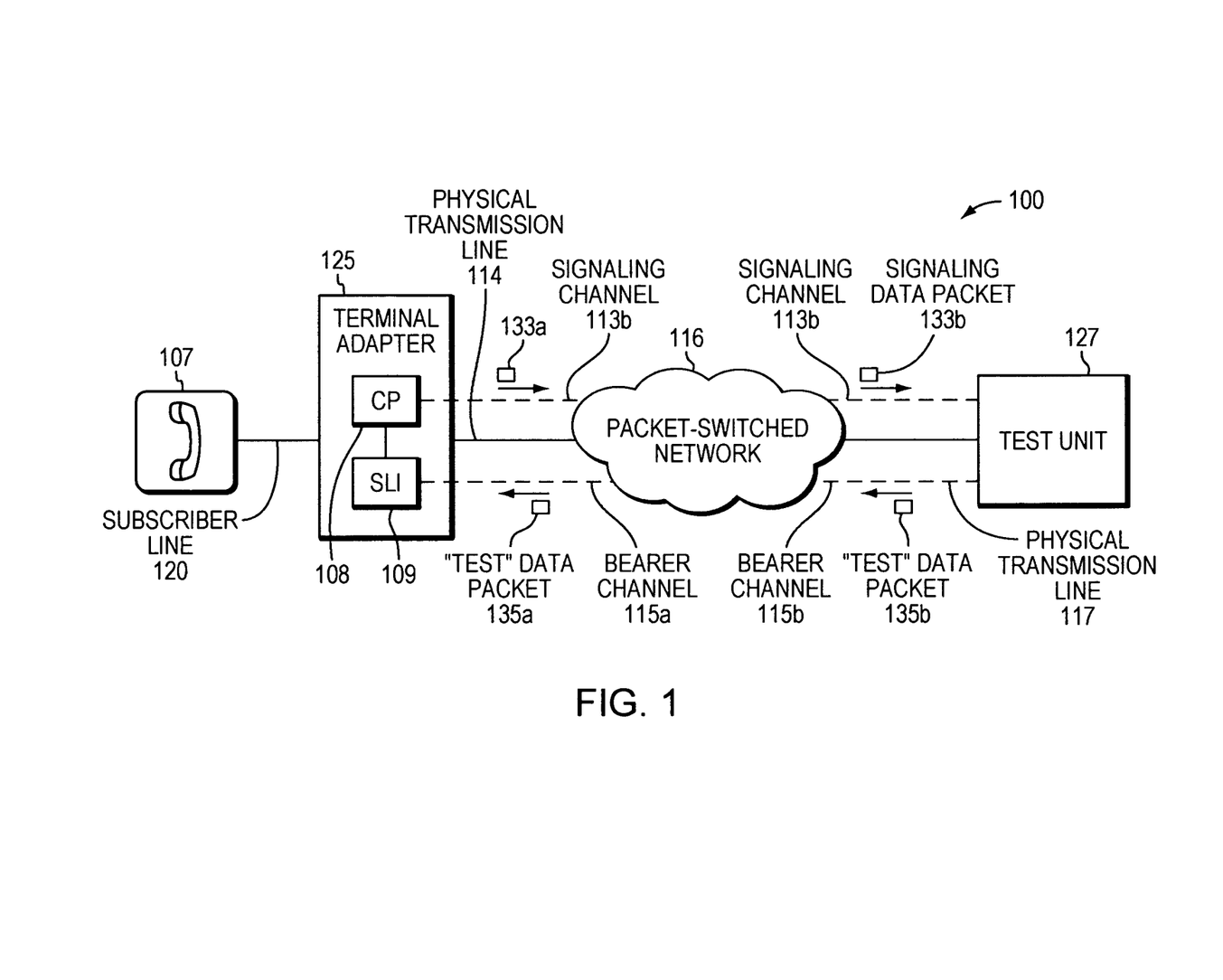
FIG. 1 is a block diagram of a packet-switched telecommunications network in which embodiments of the present invention may be implemented.

FIG. 1 is a block diagram of a communications network 100 in which embodiments of the present invention may be implemented. A Terminal Adapter (TA) 125 connects to a subscriber line 120 to which a customer of a telecommunications service may connect a telephone instrument 107. The TA 125 also connects, via a transmission line (e.g., optical or electrical path) 114, to a packet-switched network 116, such as an Internet Protocol (IP) network. The TA 125 is operable to communicate with other elements connected to the network 116, such as a test unit 127, through an exchange of packets transmitted across the network 116. The TA 125 further adapts this communication to a form accessible by the telephone equipment 107 via the subscriber line 120. A control processor (CP) 108 and subscriber line interface (SLI) 109 are located at the TA 125.

By translating communications between the network 116 and subscriber line 120, the TA 125 enables the telephone equipment 107 to send and receive communications across the network 116. The translation may include converting the communications between packet data, which is suitable for transmission across the network 116, and analog signals corresponding to bearer information, which is suitable for exchange with the telephone equipment 107. In this sense, the TA 125 is an analog terminal adapter (ATA). Alternatively, the telephone equipment 107 may have as a component the TA, which then communicates directly with the physical transmission line 114.

The TA 125 may include any combination of hardware and/or software to perform the aforementioned translation, such as a stand-alone peripheral or a computer (not shown), operating a software program, connected to the network 116. One skilled in the art will further appreciate that the TA 125 may be embedded as a component of the telephone equipment 107. For example, the telephone equipment 107 may (i) connect to the network 116, (ii) communicate with other elements across the network, and (iii) operate with a user interface (e.g., a keypad and headset) to enable a user to conduct a telephone call across the network 116. Alternatively, a personal computer can be configured to realize this same behavior.

The test unit 127 is a network device and is connected to the network 116 via a transmission line 117. The test unit 127 may be included with or in a soft switch (not shown) or is otherwise accessible across the network 116. The test unit 127 is configured to detect a communication from the terminal adapter 125 across the network 116 and respond by transmitting a "test" payload to the terminal adapter 125, which the terminal adapter 125 may use to evaluate in order to verify the integrity of the bearer information, and, by implication, transmission path(s).

Due to the architecture of the packet-switched network 100, a prior art DBDT test is ineffective for verifying the integrity of communications channels across the entire network 100. Whereas, in traditional circuit-switched networks, a dial tone is generated by a remote circuit switch and transmitted across a circuit-switched network, in the packet-switched network 100, a dial tone is generated by the TA 125. Thus, a craft person attempting to test the packet-switched network 100 using the circuit-switched network technique would detect a dial tone at the telephone equipment 107 and only verify the operation of the TA 125, telephone equipment 107, and subscriber line 120. Moreover, in a circuit-switched network, signaling and bearer channels share a common transmission line throughout the network, meaning that a prior art DBDT test effectively verifies both channels. In contrast, packets corresponding to bearer and signaling information may be transmitted through any number of different paths across a packet-switched network 116. Thus, verifying a single transmission line may not verify bearer and signaling channels across the packet-switched network 116.

In embodiments of the present invention, the TA 125 initiates a call to the test unit 127 across the network 116. The CP 108 negotiates a signaling channel 113*a-b* (including signaling channels 113*a*, 113*b* and associated communications channels across the packet-switched network 116) through the network 116 to the test unit 127. Through the signaling channel 113*a-b*, the CP 108 and test unit 127 exchange signaling data packets 133*a-b* to set up the call, thereby establishing a bearer channel 115*a-b* (including bearer channels 115*a*, 115*b* and associated communications channels across the packet-switched network 116) to carry bearer information. Both the signaling channel 113*a-b* and bearer channel 115*a-b* may not be carried on a physical, dedicated transmission line, but instead may carry signaling data packets 133*a-b* and "test" data packets 135*a-b* along different paths and through any number of elements of the network 116. The signaling channel 113*a-b* and bearer channel 115*a-b* may therefore be considered sessions between subscriber line interfaces of the TA 125 and test unit 127. The CP 108, by transmitting data packets 133*a-b* over the signaling channel 113*a-b*, causes the test unit 127 to respond by transmitting a "test" payload via data packets 135*a-b* over the bearer channel 115*a-b*. The "test" payload may include bearer information representing a test tone of expected frequency, amplitude and/or length. The SLI 109 expects and detects this information via the bearer channel 115*a-b*.

Upon receiving the payload at the TA 125, the CP 108 controls the SLI 109 to expect, detect and filter the payload. The CP 108 then retrieves from the SLI 109 relevant payload data and evaluates the constituent information (e.g., a test tone) by determining characteristics of signal(s) represented by the payload (e.g., amplitude, energy, and noise of an audio signal) and comparing the characteristics to one or more thresholds. If the thresholds are met or exceeded for the payload, then the CP 108 can determine that the bearer channel 115*a-b* was successfully negotiated and that the bearer channel 115*a-b* successfully carried the payload. Thus, the TA 125 may verify the integrity of the bearer channel 115*a-b*. Moreover, the bearer channel 115*a-b* is created as a result of communications over the signaling channel 113*a-b*, and therefore depends upon the signaling channel 113*a-b* being operational. For this reason, by successfully verifying the integrity of the bearer channel 115*a-b*, the CP 108 can also infer that the signaling channel 113*a-b* has sufficient integrity to enable the subject call (i.e., communications of the test data packets 135*a-b* over the bearer channel 115*a-b*). Thus, the aforementioned test may verify the integrity of both a bearer channel 115*a-b* and, by implication, a signaling channel 113*a-b* across a packet-switched network 116. A particular example of such a test is described below with reference to FIG. 5.

Figure 2A:
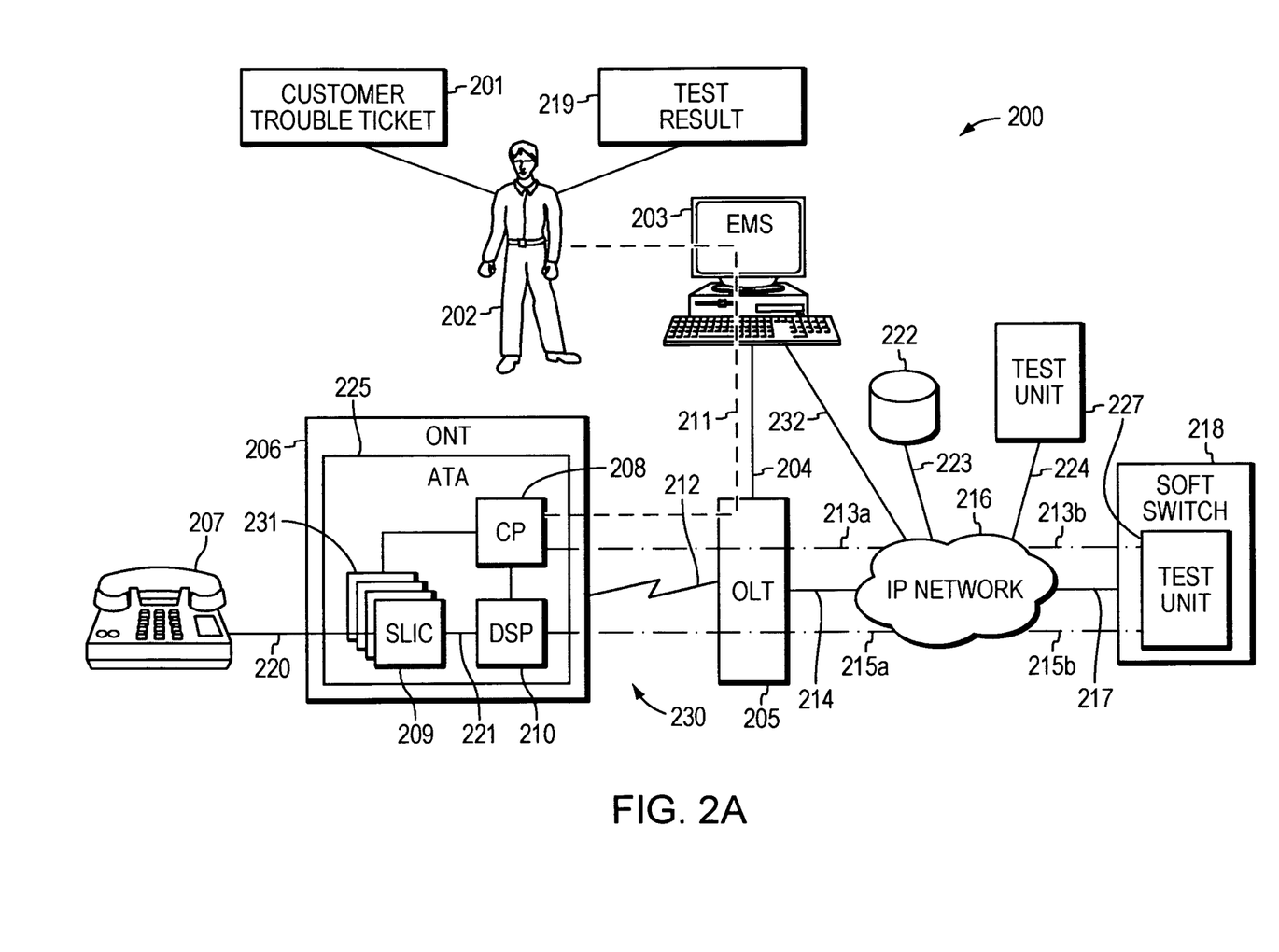
FIG. 2A is a block diagram of a VoIP telecommunications system in which embodiments of the present invention may be implemented.

FIG. 2A is a block diagram of a VoIP telecommunications network 200 in which embodiments of the present invention may be implemented. The network 200 may incorporate elements of the network 100 described above in reference to FIG. 1. The telecommunications network 200 includes a customer provided telephone instrument 207 that is connected to a Distributed Digital Loop Carrier (DDLC) system 230 by way of a subscriber loop 220. The DDLC 230 may include an Optical Network Terminal (ONT) 206 and an Optical Line Terminal (OLT) 205. The DDLC may further include multiple ONT and or OLT units (not shown). The DDLC 230 also connects to an IP network 216 by way of a network transmission line 214, and the IP network 216 is connected to a soft switch 218 by way of a network transmission line 217. A test unit 227 may be a component (e.g., hardware, firmware or software) of the soft switch 218, or may be separate from the soft switch 218 and connected to the IP network 216 through a network transmission line 224.

In this embodiment, the ONT 206 includes an Analog Terminal Adapter (ATA) 225 that connects to the OLT 205 via an optical signal path 212. The ATA 225 is one terminal adapter that may operate in this embodiment, and, alternatively, may be replaced by a terminal adapter meeting requirements to interface with alternative telephone equipment 207 (e.g., a digital telephone or software program). The ATA 225 includes a plurality of subscriber line interface circuits (SLIC) 231, a digital signal processor (DSP) 210, and a control processor (CP) 208 that may select and control a particular SLIC 209 among the plurality of SLICs 231, as well as control the digital signal processor 210. A signal bus 221 carries communications between the SLIC and the DSP, and may be considered a pulse-code modulation (PCM) highway. Thus, communications initiated at the telephone instrument 207 may be transmitted through the SLIC 209 to the DSP 210, where they are processed for further transmittal through the optical signal path 212 to the OLT 205.

A software control program (not shown) may be implemented by the control processor 208 to operate the SLIC 209 and digital signal processor 210. The control processor 208 may be configured according to the software control program or according to configuration data that is selected from a plurality of configuration data stored at a configuration database 222. The configuration database 222 is connected to the IP network 216 by way of a network transmission line 223, and stores a plurality of configuration data that may be maintained by way of an element management system (EMS) 203. The ATA 225 may interrogate the configuration database 222 to retrieve configuration data for the purpose of adapting the ATA 225 for a particular purpose. For example, the configuration data may provide address information to locate one or more test units 227, as well as threshold values for evaluating detected audio signals.

The element management system 203 is connected by way of a network transmission line 204 to the distributed digital loop carrier (DDLC) system 230. The DDLC system 230 may receive a control signal 211 from the EMS 203, enabling an inside craft person 202 to control remotely the DDLC system 230 to initiate a test and receive test results. The EMS 203 may also connect to the IP network 216 by way of a network transmission line 232, enabling the craft person 202 to monitor and control network elements connected to the IP network 216.

A customer trouble ticket 201 is a record indicating a fault or other issue in the network 200 operation. The ticket 201 may be produced, for example, in response to a notification by a system component or a customer complaint, and is referenced by an inside craft person 202 for the purpose of rectifying the fault and regulating the proper operation of the telecommunications network 200. A test result 219 is a record indicating results of tests performed on the example telecommunications system elements 206, 205, 216, thereby providing feedback to repair the fault and regulate the operation of the telecommunications network 200.

In operation, the ATA 225 establishes a logical signaling channel 213a-b (including signaling channels 213a, 213b and associated communications channels across the IP network 216) to the soft switch 218 by way of a combination of the DDLC 230, network transmission line 214, IP network 216, and network transmission line 217. The signaling channel 213 carries communications (not shown) that may supervise a dialog between the ATA 225 and the soft switch 218, such as administrative data of a telephone call. Through the same network elements, the ATA 225 further establishes a logical bearer channel 215a-b (including bearer channels 215a, 215b and associated communications channels across the IP network 216) to the soft switch 218, thereby providing a path to exchange a periodic series of bearer information packets (not shown). The bearer channel 215 is established as a result of the supervisory dialog that transpires by way of the signaling channel 213, and the bearer channel 215 is logically associated with and dependent on the signaling channel 213, but may traverse the IP network 216 by way of separate and disjoint paths. The signaling channel 213 and the bearer channel 215 are ephemeral in nature, meaning that they are created on demand by the ATA 225. A VoIP communication is realized as the combination of the supervisory dialog occurring on the signaling channel 213 and the exchange of the series of bearer information packets (not shown) over the bearer channel 215.

Further, the control processor 208 may initiate communications with a soft switch 218 or other element across the IP Network 216, the communications being observed for testing purposes. A further embodiment of the present invention, illustrating a method of verifying integrity of a VoIP telecommunications network, is described in further detail below in reference to FIGS. 4 and 5. This method described below may be implemented in the VoIP network 200 of FIG. 2A.

Figure 2B:
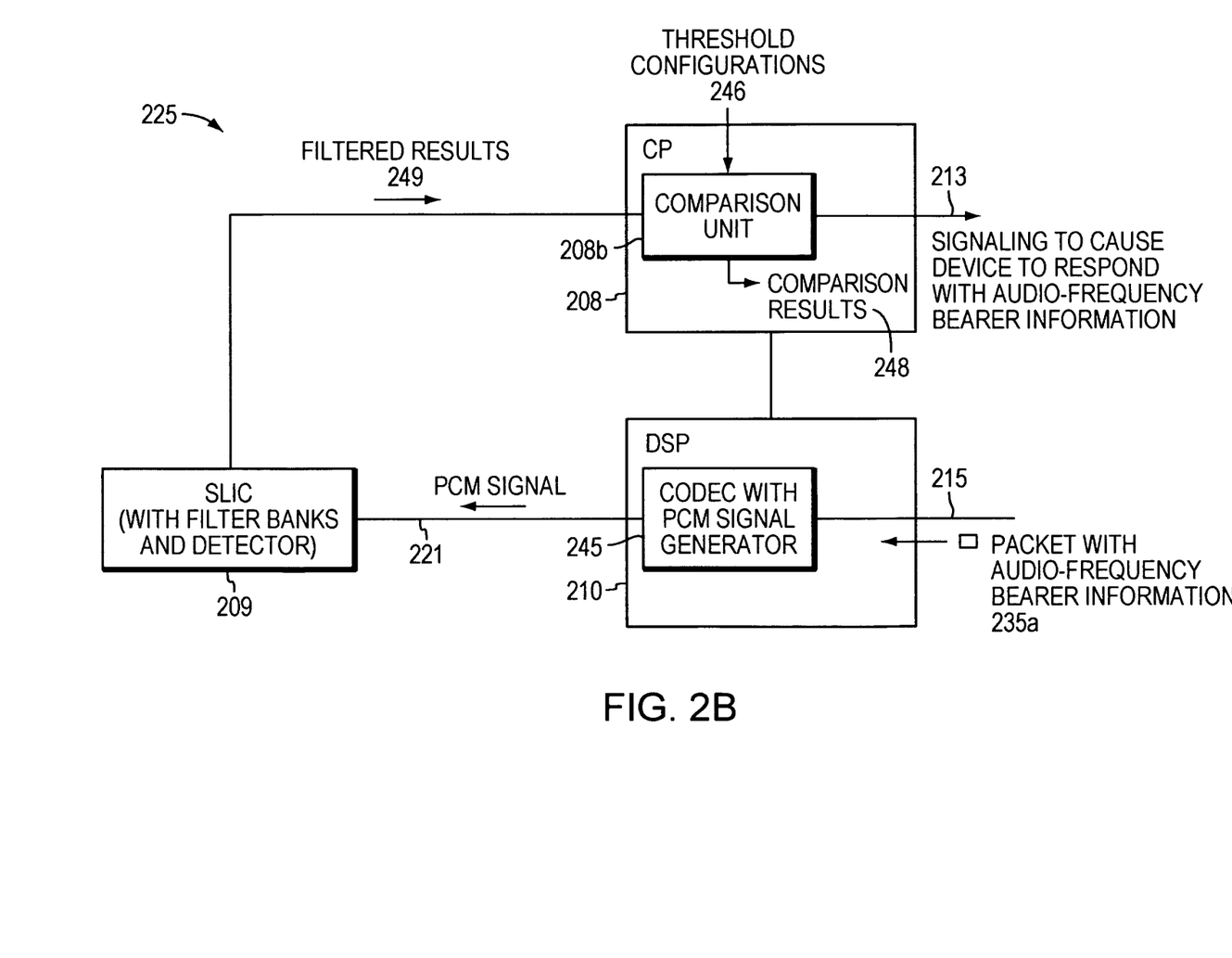
FIG. 2B is a block diagram of components of the VoIP telecommunications system of FIG. 2A in further detail.

FIG. 2B is a block diagram illustrating components of an Analog Terminal Adapter 225 in further detail. With reference to FIG. 2A, the control processor (CP) 208 receives threshold configurations 246 from an external element, such as the EMS 203 or configuration database 222. A digital signal processor (DSP) 210 is coupled to a subscriber line interface circuit (SLIC) 209 by way of a PCM signal path 242. The DSP 210 processes received packets with bearer information, such as packet 235a, and generates a corresponding PCM signal across the path 221 to the SLIC 209. The DSP 210 may also respond to communications from the SLIC 209, including indications of on-hook and off-hook states of a corresponding subscriber line 220, as well as DTMF digits dialed at the telephone equipment 207. For example, the DSP 210 may respond to an off-hook state by generating a dial tone, which is received by the SLIC 209 across the signal path 221. The DSP 210 may further respond to a received DTMF digit by breaking the dial tone and transmitting data packets corresponding to the DTMF digit across the network 216 via the bearer channel 215. Thus, a typical, prior art, draw and break dial tone (DBDT), if implemented at an ATA 225 as shown in FIG. 2B, would verify the integrity of components internal to the ATA 225, such as the SLIC 209, DSP 210, CP 208 and signal path 221, but not integrity through the network outside the ATA 225. Because the dial tone is drawn and broken at the DSP 210, the prior-art DBDT test would fail to verify the integrity of channels 213, 215 across the network 216.

Embodiments of the present invention provide for verifying the integrity of channels across a packet-switched network. In FIG. 2B and with reference to FIG. 2A, the CP 208 transmits signaling, via the signaling channel 213, across the IP network 216 and to a device, such as the test unit 227, causing the device to respond with bearer information. A series of packets, such as packet 235a, representing the bearer information is received at the DSP 210. Additional packets of that series of packets (not shown), representing the entirety of the bearer information, may be received in the same manner as the packet 235a. A codec module 245 generates pulse code modulation (PCM) signals corresponding to received elements of a call (e.g., dial tone, DTMF digits, and audio bearer information). The codec module 245 receives the packet 235a and generates a corresponding PCM signal to the SLIC 209. The SLIC 209 may include a number of configurable filter banks, and applies the filters to the received PCM signal to provide filtered audio bearer information. The filtering may be implemented as described below in reference to the process 500 of FIG. 5.

Filtered results 249 are retrieved by a comparison unit 247 at the CP 208. The comparison unit 208b compares characteristics of the filtered results 249 (e.g., amplitude, energy and noise) to thresholds according to the received threshold configurations 246. As a result of this comparison, the comparison unit 247 outputs comparison results 248. The comparison results 248 indicate whether the filtered results meet the thresholds, which, in turn, indicate whether the bearer information 235a meets the expected thresholds.

It should be understood that the DSP 210 may also be configured to negotiate codec parameters, such as in a coded domain 3G network. The DSP 210 can decode the parameters, such as fixed or adaptive codebook gains or vectors, to linear domain parameters and compare the linear domain parameters against respective thresholds. Results can be reported from the DSP 210 to the CP 208. Since this technique bypasses testing of the bus 221, the SLIC 209 may be configured to perform the decode/compare process.

Figure 3:
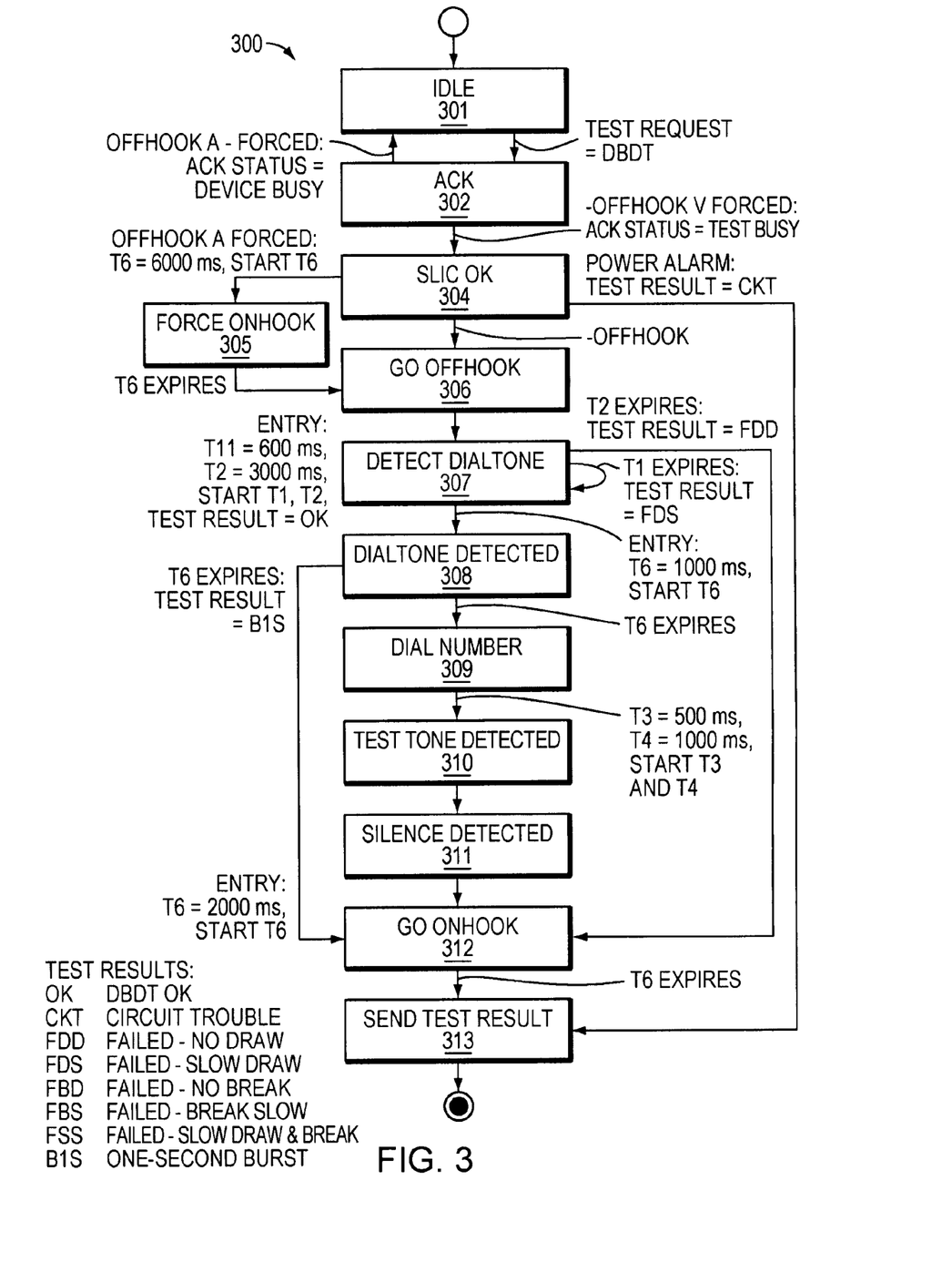
FIG. 3 is a state diagram of a software control program illustrating and example software embodiment of the present invention.

FIG. 3 is a state diagram 300 of a software control program configured to operate in a telecommunications network such as the network 200 of FIG. 2A. The program may be implemented, for example, by the control processor 208 at the subject ATA 225 or other device configured to control the ATA 225. The software control program may conduct a DBDT test to verify components of the ATA, such as the SLIC 209 and DSP 210. Further, the program may facilitate receiving a test tone from a test unit (e.g., test unit 227) across a VoIP network, where the test tone may be evaluated by further processes, such as the process 500 of FIG. 5, described below.

Referring to FIG. 3, at state 302, the program acknowledges a request to initiate a DBDT test. The request may be received by an external module, such as an EMS, or may be initiated automatically at the ATA to conduct a scheduled test of the network. If the subject subscriber line is busy, the program returns to an idle state 301 unless the test is forced. If the test is forced or the line is initially unoccupied, then the program initiates the test by verifying the power status of the SLIC (state 304). An instruction to force the test may enable the program to initiate the test, as well as evaluate a received test tone, independent of the hook state of the subscriber line. A power alarm ("CKT," indicating a fault at the SLIC) causes the program to terminate and report the alarm (state 313). Otherwise, the program controls the SLIC to cause the subscriber line to go off-hook (state 306). If the line is already off-hook, the program first forces an on-hook state (state 305), and then goes off-hook (state 306) after a specified time has elapsed.

Once the SLIC is off-hook, the program expects the SLIC to detect a dial tone provided by the DSP. In one embodiment, timers T1 and T2 are initiated for 600 and 3000 milliseconds, respectively. If T1 expires before a dial tone is detected (state 307), then a test result FDS (indicating a slow draw) is noted. Likewise, if T2 expires before a dial tone is detected, then the test ends by returning the line to an on-hook state 312 and reporting the test result FDD, indicating a failure to draw a dial tone.

If a dial tone is detected (state 308), then timer T6 is set for 1000 ms and started. If the timer T6 does not expire before the dial tone ceases, then the test ends by returning the line to an on-hook state 312 and reporting the test result B1S, indicating a one-second burst. If T1 instead expires while a dial tone remains, then a number is dialed (309). The number may correspond to the address of a test unit across an IP network. Upon initiating the dialing, the timers T3 and T4 are set and started for 500 ms and 1000 ms, respectively. If timer T3 expires before the dial tone ceases, then a test result FBS (indicating a slow break) is noted. Likewise, if timer T4 expires before the dial tone ceases, then the test ends by returning to an on-hook state 312 and reporting the test result FBD, indicating a failure to break the dial tone.

Provided that the respective system successfully dials a responsive test unit, the test unit may respond by returning a test tone to be received by the subject system. The test tone is detected at the subscriber line (state 310) until silence is detected (state 311), indicating the end of the test tone. The program then controls the system to return to an on-hook state 312. If the test results indicate a slow draw and a slow break, a test result FSS indicating as such may also be noted. Results of the test, including the above described test results and data regarding the detected test tone, may be sent to other software or hardware modules for further analysis (state 313). For example, test results may be sent to an EMS to be reported to a craft person, and data regarding the test tone may be forwarded to another software module at the CP at the ATA for evaluation of the test tone.

Figure 4:
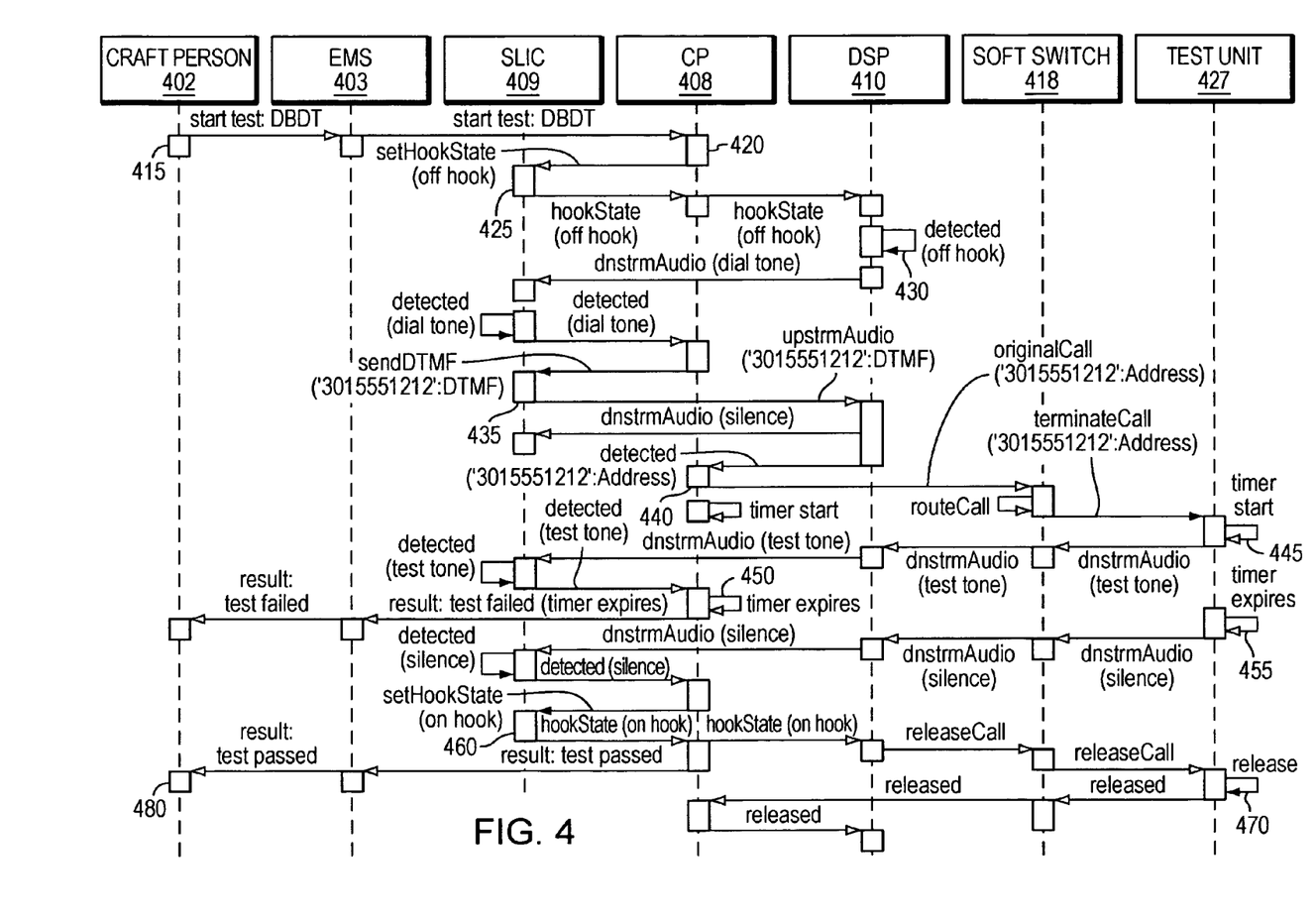
FIG. 4 is a state diagram of communications between cooperating elements in a VoIP telecommunications system employing an embodiment of the present invention.

FIG. 4 is a state diagram of communications between cooperating elements in an example VoIP telecommunications system employing an embodiment of the present invention. The communications may be implemented in a VoIP network such as the network 200 of FIG. 2. The communications follow a test conducted by a craft person 202 interfacing with an EMS 203. The test may be referred to as a "DBDT" test because it is analogous to the prior-art DBDT test in that it may verify network elements across a telecommunications network. However, it should be noted that the test operates differently from the prior-art DBDT test in several ways, as described below.

In one embodiment, a craft person 402 initiates a test at the EMS 403 (415), which indicates to the CP 408 to begin the test. The CP 408 controls the SLIC 409 to enter an off-hook state (420), which, in turn, is communicated to the DSP 410 (425). Upon detecting the off-hook state (430), the DSP 410 transmits a dial tone to the SLIC 409. The CP 408 may verify the dial tone (435) and control the SLIC 409 to transmit an address to the DSP 410 as a series of DTMF tones. The address may correspond to a telephone number or other data to contact the test unit 427 across an IP network. The address may be provided by the EMS 403 directly or indirectly or by way of a configuration stored at the database connected to the IP network. In response to receipt of the address from the SLIC 409, the DSP 410 transmits silence to the SLIC 409 and returns the detected address to the CP 408.

The CP 408 originates a call (440) by selecting a test unit, which corresponds to the address by way of the IP network and the soft switch 418. The soft switch 418 further routes the call to the test unit 427 located at or near the soft switch 418. The test unit may be configured to transmit a programmed "test tone" through the IP network via a series of network packets. The test unit 427 starts a timer and transmits the test tone downstream (445), through the IP network, where it is received by the DSP 410 and passed to the SLIC 409. The SLIC 409 is configured to expect and detect the test tone, and, upon expecting the test tone, the CP 408 begins a CP timer (440). The CP timer may be set for a length of time similar to that of the test unit timer. If the CP timer expires (450) before the SLIC detects the test tone, then the CP 408 reports to the EMS 403 that the test has failed. Thus, in this embodiment, the CP timer requires that the test tone is to be detected within a specified period of time.

When the test unit timer expires, the test unit 427 ceases transmitting the test tone and instead transmits silence downstream (455). The CP 408 ends the call by controlling the SLIC to enter an on-hook state (460), which, in turn, causes the DSP 410 to release the call with the soft-switch 418. The test unit 427 responds by communicating the released state to the CP 408 (470), thereby confirming the termination of the call. The CP 408 also returns a message to the EMS 403 indicating that the test successfully received a test tone from the test unit 427. The message may further be communicated to the craft person 402 (480).

The test tone may be evaluated by the CP 208 to verify the integrity of the VoIP network. An embodiment of one such evaluation process is described in further detail below in reference to FIG. 5.

Figure 5:
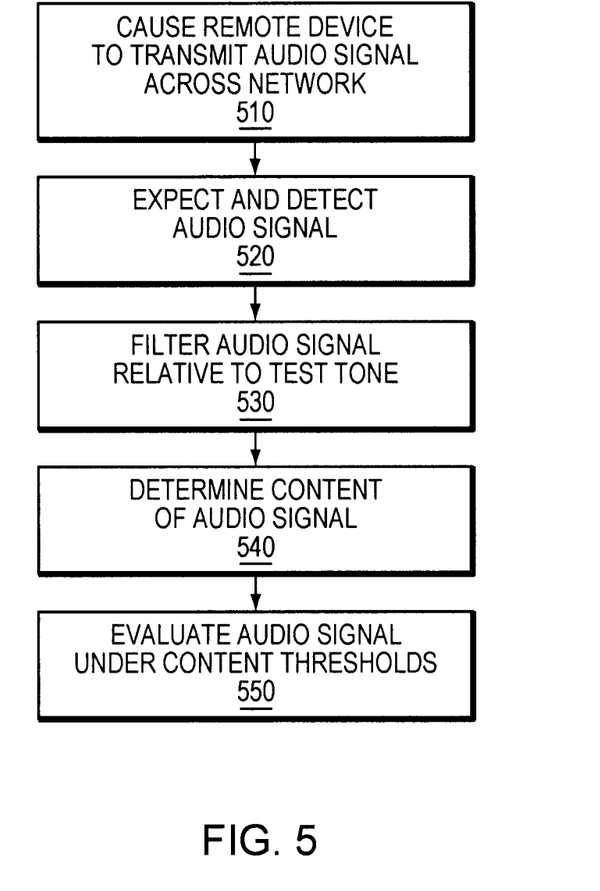
FIG. 5 is a flow chart illustrating a process of evaluating a test tone of an audio signal in order to verify the integrity of a logical channel.

FIG. 5 is a flow chart of a process 500 by which a received test tone may be evaluated. The process may be implemented by elements of the networks 100, 200 of FIGS. 1 and 2A, and may be employed to evaluate a test tone, such as a test tone received by the process illustrated in FIG. 4. A system implementing the software state diagram of FIG. 3 may also obtain a test tone suitable for evaluation by this process 500. With reference to elements of FIG. 2A, the test tone may be received at a SLIC 209 and evaluated by a CP 208 operating in accordance with a software control program. Alternatively, the CP 208 may transmit data corresponding to the test tone to an external module, such as an EMS 203, to be evaluated.

Embodiments of the invention first cause audio signal information to be transmitted by a test unit on a bearer channel across an IP network (510). The audio signal information may correspond to or include information representing a test tone transmitted by, for example, a test unit 227 of FIG. 2 in response to signaling (a received call) from an ONT 206 across an IP network 216. The transmission may occur by a respective sequence of data packets transmitted by the test unit, which are received by a DSP 210. The DSP translates the data packets to provide the corresponding audio signal to the SLIC 209. In one embodiment, the test tone component of the audio signal may be a 1004 Hz tone at 0 dBm when terminated into a 600 ohm termination at the SLIC 209. The test tone may be referred to as a "digital milliwatt" or a payload.

The SLIC 209 may be configured by the CP 208 to expect and detect the audio signal (520). The audio signal may be represented by a pulse code modulation (PCM) signal. As described above in reference to FIG. 4, the audio signal is expected to include the test tone for a specified period of time, after which silence is expected. If such expectations are not met, the CP 208 may report a test failure.

Once the SLIC 209 receives the audio signal, it filters the signal to produce a number of filtered results (530). The filtering may be accomplished by a number of configurable filters at the SLIC 209. By first configuring the filters in all-pass mode, the CP 208 controls the SLIC 209 to present a first filtered signal representing the full audio signal to a detector within the SLIC 209. From this first signal, a first energy measurement is reported. By configuring the filters in a cascaded band-stop configuration to remove the tone frequencies of the expected test tone (i.e., the digital milliwatt), the SLIC may then present a second filtered signal representing the audio signal without the test tone. From the second filtered signal, a second energy measurement is read from the detector.

From the filtered results and energy measurements, a software control program at the CP 208 or other module may determine content of the audio signal (540). The software control program may first compute the amplitude in decibels of the first energy measurement, the result being, for example, an amplitude in decibels relative to 0 dBm. The same computation may be done for the second energy measurement, resulting in a second amplitude value that is comparable to the first amplitude value. The software may further calculate the difference between the first and second amplitude values, resulting in an amplitude differential between the audio signal and the audio signal with the test tone removed.

Based on the calculated results, the software control program may qualify the audio signal with the test tone according to expected thresholds (550). The first amplitude value represents the amplitude of the audio signal including the test tone. This first amplitude value is compared to an amplitude threshold, and, if the first amplitude value meets or exceeds this threshold, then the audio signal is qualified as having a satisfactory amplitude. Further, the amplitude differential corresponds to the noise in the audio signal. The amplitude differential may be compared to a predetermined noise threshold value, and if the amplitude differential meets or exceeds this threshold, then the audio signal may be qualified as having a satisfactory ratio of test tone to noise. Conversely, if the amplitude and amplitude differential fail to meet or exceed the thresholds, then the software control program may report that the audio signal has failed to meet the requisite amplitude and noise thresholds.

The results of qualifying the amplitude and noise of the audio signal may further be transmitted to an external module connected to the network, for example the EMS 203 of FIG. 2A. Here, the results may be reported to a craft person 202 for diagnosis of the network 200. In particular, if the amplitude and noise meet the predetermined thresholds, then the results effectively verify the integrity of the bearer channel through which representations of the audio signal was transmitted. For example, the bearer channel 215, which extends from the DSP 210, through the IP network 216 and to the test unit 227, may be verified through a successful evaluation of a bearer channel signal, having a payload representing an audio signal, transmitted by the test unit 227 and received by the DSP 210.

Moreover, the results of the qualifying may, by implication, verify the integrity of the signaling channel associated with the subject bearer channel. Such verification may be made due to the dependency of the bearer channel on the signaling channel. Referring again to FIG. 2A, for example, the bearer channel 215 is established as a product of communication between the CP 208 and test unit 227. Due to this relation, if the bearer channel 215 is verified to carry a representation of an audio signal meeting the predetermined thresholds, then the PC 208 or craft person 202 can conclude that the signaling channel has successfully negotiated a transmission across the IP network 216. Thus, the integrity of the signaling channel 213 can be verified implicitly by verifying the integrity of the bearer channel 215.

One skilled in the art will appreciate that operations performed by various components described above with reference to FIG. 1-5 may be performed by computer hardware, firmware, or software. Further, an embodiment of the present invention may include one or more computer program products with instructions executable by a computer processor and cause the computer to perform one or more of the operations described herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method of verifying integrity of a logical channel traversing a Voice over Internet Protocol (VoIP) network, the method comprising:
   transmitting, via a signaling channel, a signal known to cause a device to respond with bearer information via a bearer channel over the VoIP network;
   generating pulse code modulation (PCM) signals as a function of the bearer information;
   transmitting the PCM signals to a subscriber line interface circuit (SLIC) via a bus; and
   evaluating the bearer information based on the PCM signals to verify integrity of the bearer channel on the VoIP network.

2. The method according to claim 1 further including verifying a signaling channel associated with the bearer channel based on evaluating the bearer information.

3. A method according to claim 1 wherein evaluating the bearer information includes filtering the pulse code modulation (PCM) signals derived from the bearer information.

4. The method according to claim 3 wherein the filtering is performed at the SLIC to test the bus.

5. The method according to claim 1 wherein evaluating the bearer information is independent of a hook state of customer provided equipment.

6. The method according to claim 1 wherein evaluating the bearer information includes:
   detecting the bearer information;
   filtering the bearer information according to an expected frequency of the information to produce a filtered bearer signal;
   calculating at least one parameter defining the bearer information; and
   comparing the at least one parameter to at least one parameter threshold.

7. The method according to claim 1 further including reporting results of the evaluating to an operator or a network node to verify integrity of the logical channel.

8. The method according to claim 1 further including initiating said causing the device to respond with bearer information from a control location external from a remote location causing the device to respond.

9. The method according to claim 1 further including programming thresholds used in evaluating the bearer information.

10. The method according to claim 1 further including interrogating a database to locate a local device to use as the device caused to respond with bearer information.

11. The method of claim 1 wherein evaluating the bearer information includes comparing amplitude and noise of the PCM signals to respective amplitude and noise thresholds.

12. An apparatus for verifying integrity of a channel traversing a Voice over Internet Protocol (VoIP) network, the apparatus comprising:
   a control processor configured to transmit, via a signaling channel, a signal known to cause a network device to respond with bearer information via a bearer channel over the VoIP network, and the control processor further configured to evaluate the bearer information to verify the integrity of the bearer channel;

a digital signal processor (DSP) configured to generate pulse code modulation (PCM) signals as a function of the bearer information and transmit the PCM signals via a bus; and a subscriber line interface configured to receive the PCM signals via the bus and provide data to the control processor about the bearer information to verify integrity of the bearer channel.

13. The apparatus of claim 12 wherein the control processor verifies a signaling channel associated with the bearer channel based on evaluating the bearer information.

14. The apparatus of claim 13 wherein the control processor establishes the signaling channel with the network device.

15. A apparatus of claim 12 wherein the subscriber line interface is configured to filter the pulse code modulation (PCM) signals derived from the bearer information.

16. The apparatus of claim 12 wherein the control processor evaluates the bearer information independent of a hook state of customer provided equipment associated with the subscriber line interface.

17. The apparatus of claim 12 wherein the control processor evaluates the bearer information by comparing characteristics of a filtered bearer signal to characteristic thresholds to determine whether the bearer information meets expected thresholds.

18. The apparatus of claim 12 wherein the control processor reports results of the evaluating to an operator or a network node to verify integrity of the logical channel.

19. The apparatus of claim 18 where in the control processor is controlled by the operator or network node.

20. The apparatus of claim 12 wherein the control processor receives thresholds used in evaluating the bearer information.

21. The apparatus of claim 12 wherein the control processor is configured according to one of a plurality of configurations stored at a database, the database being accessible to the control processor across the VoIP network.

* * * * *